(12) United States Patent
Lee

(10) Patent No.: US 7,493,698 B2
(45) Date of Patent: Feb. 24, 2009

(54) KEYLESS CLAMP DEVICE FOR RECIPROCATING SAW

(76) Inventor: Hsin-Chih Chung Lee, No. 21-8, Shang San Cho Woo, Wuchang-Li, Chungli City, Tao Yuan Hsien (TW)

( * ) Notice: Subject to any disclaimer, the term of this patent is extended or adjusted under 35 U.S.C. 154(b) by 302 days.

(21) Appl. No.: 11/610,804

(22) Filed: Dec. 14, 2006

(65) Prior Publication Data

US 2008/0141545 A1    Jun. 19, 2008

(51) Int. Cl.
*B27B 19/09* (2006.01)
(52) U.S. Cl. .............................. 30/392; 30/339; 279/79
(58) Field of Classification Search .................. 30/339, 30/392; 279/76, 77, 79
See application file for complete search history.

(56) References Cited

U.S. PATENT DOCUMENTS 5,324,052 A * 6/1994 Ortmann ..................... 279/83
5,458,346 A * 10/1995 Briggs ......................... 279/97
6,009,627 A * 1/2000 Dassoulas et al. ............. 30/392
7,040,023 B2 * 5/2006 Nemazi et al. ................ 30/392
7,210,232 B2 * 5/2007 Guo ............................ 30/392

* cited by examiner

*Primary Examiner*—Hwei-Siu C Payer
(74) *Attorney, Agent, or Firm*—Rabin & Berdo, P.C.

(57) ABSTRACT

A clamp device for a reciprocating saw is disclosed herein, which does not require the use of a tool for saw blade replacement. The main feature of the device is that two clamping blocks are pivotally mounted on a bracket and each of the clamping blocks has a tooth portion and a cam portion formed on an outer surface thereof. An elastic member is located between the bracket and the clamping blocks. A button connected to a rod, which passes through a cover plate of the bracket and includes a tooth slot for engaging with the tooth portion of the clamping block. When the rod moves in an axial direction, the two clamping blocks are brought to rotate so that the cam portion can fasten or loosen the saw blade, and thereby the saw blade can be mounted and demounted conveniently and rapidly.

3 Claims, 6 Drawing Sheets

KEYLESS CLAMP DEVICE FOR RECIPROCATING SAW

BACKGROUND OF THE INVENTION

1. Field of the Invention

The present invention generally relates to a clamp device for mounting a saw blade on a reciprocating saw and in particular to a keyless clamp device that can replace the saw blade rapidly.

2. The Prior Arts

A conventional electric reciprocating saw requires hardware to mount and demount a saw blade, which is very inconvenient to operate.

SUMMARY OF THE INVENTION

A primary objective of the present invention is to provide a clamp device, which solves the drawback of the conventional design that needs hardware when operating a saw blade replacement.

The solution of the present invention is to equip a clamp device on a reciprocating saw, wherein the claim device comprises a clamping block and a button for controlling the clamping block. When the button is pressed, the clamping block can be driven to rotate. Along the rotation of the clamping block, a cam portion of the clamping block can fasten or loosen the saw blade, whereby the saw blade can be mounted and demounted rapidly and conveniently without using other tools.

According to the present invention, two clamping blocks are pivotally mounted on a bracket, each of which comprises a tooth portion and a cam portion formed on outer surface thereof. An elastic member is disposed between the bracket and the clamping block. A button is connected to a rod, which passes a cover plate of the bracket and has a tooth slot for engaging with the tooth portion of the clamping block. When the button is pressed to move the rod in an axial direction, the two clamping blocks rotate to make the cam portion loosened so that the saw blade could be put in; when the button is released, the clamping blocks will rotate back by the elastic member, and thereby the saw blade is fastened on the bracket by the pressure of the cam portion.

The clamp device in accordance with the present invention can mount and demount the saw blade without the use of the tools by the engagement of the button and the clamping blocks. The cam portion formed on the clamping block can fasten or loosen the saw blade when the clamping block is rotated by the movement of the rod, such that the saw blade can be mounted and demounted simply and easily.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
FIG. 1 is a perspective view showing a clamp device in accordance with the present invention using on a reciprocating saw.
Figure 2:
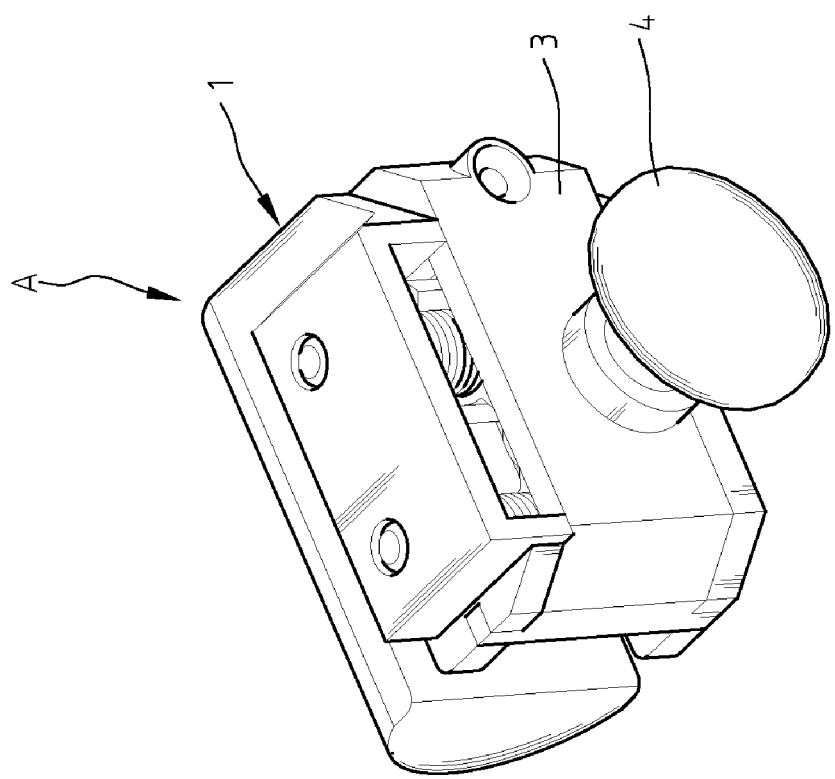
FIG. 2 is a perspective view showing a clamp device in accordance with the present invention.

FIG. 1 shows the general configuration of an electric reciprocating saw 7. A clamp device (A) in accordance with the present invention is positioned at the front end of the reciprocating saw 7. FIG. 2 is an enlarged view showing the clamp device (A) of FIG. 1, which comprises a bracket 1, a cover plate 3 mounted on a side of the bracket 1, and a button 4 disposed on the cover plate 3.

Figure 3:
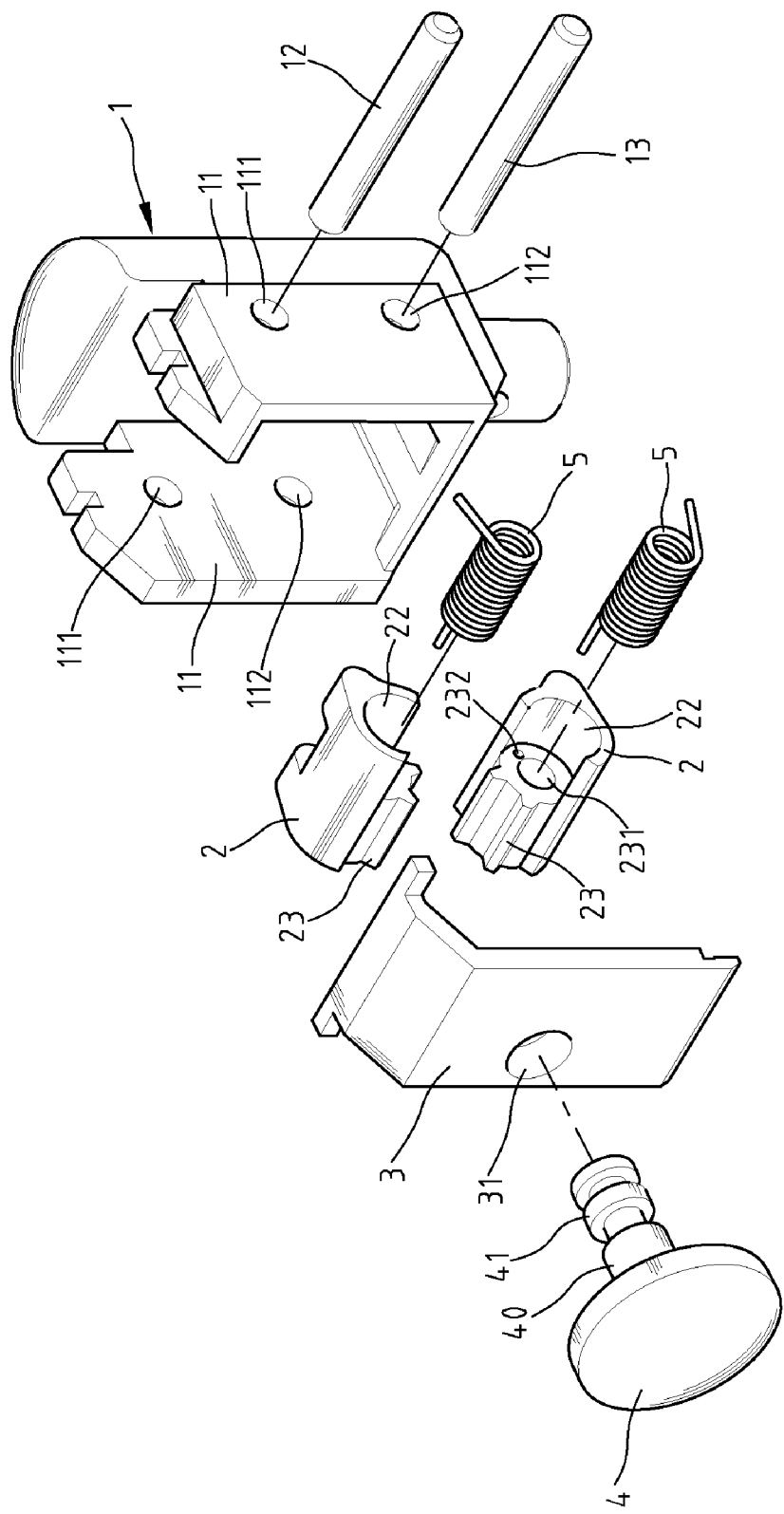
FIG. 3 is an exploded view of FIG. 2.

Referring to FIG. 3, a clamp device in accordance with the present invention comprises a bracket 1 with two parallel side walls 11. A pairs of in-line first shaft holes 111 and a pair of in-line second shaft holes 112 are formed on two side walls 11. A fixing pin 14 (see FIG. 4) is disposed on an inner surface of the bracket 1 between the two side walls 11. A space is defined between the two side walls 11, in which the two clamping blocks 2 and two elastic member 5 are placed therein. Each clamping block 2 comprises a tooth portion 23 and a cam portion 21 on an outer surface thereof, and a central opening 231 formed on a center thereof and a hole 232 is provided near the central opening 231. A groove 22 is further formed on each clamping block 2 for receiving the elastic member 5. Preferably, the elastic member 5 is a torsion spring. The first shaft 12 goes through the first shaft holes 111 formed on the bracket 1, an elastic member 5 and the central opening 231 of one clamping block 2, while the second shaft 13 goes through the second shaft holes 112, the other elastic member 5 and the central opening 231 of the other clamping block 2, thus the two clamping blocks 2 can be pivoted between the side walls 11. Meanwhile, one end of the elastic member 5 is inserted into the holes 232 and the other end of the elastic member 5 is leaned against the side wall 11.

The present invention further includes a cover plate 3 with a through hole 31 and a button 4 connected to a rod 40. The rod 40 includes a tooth slot 41 formed near an end thereof for engaging with the aforementioned tooth portion 23. The rod 40 firstly is gone through the through hole 31 of the cover plate 3 and then the cover plate 3 is fixed on the bracket 1 for covering an inner space of the bracket 1, whereby the tooth portion 23 of the clamping block 2 can engage with the tooth slots 41 of the rod 40.

Figure 4:
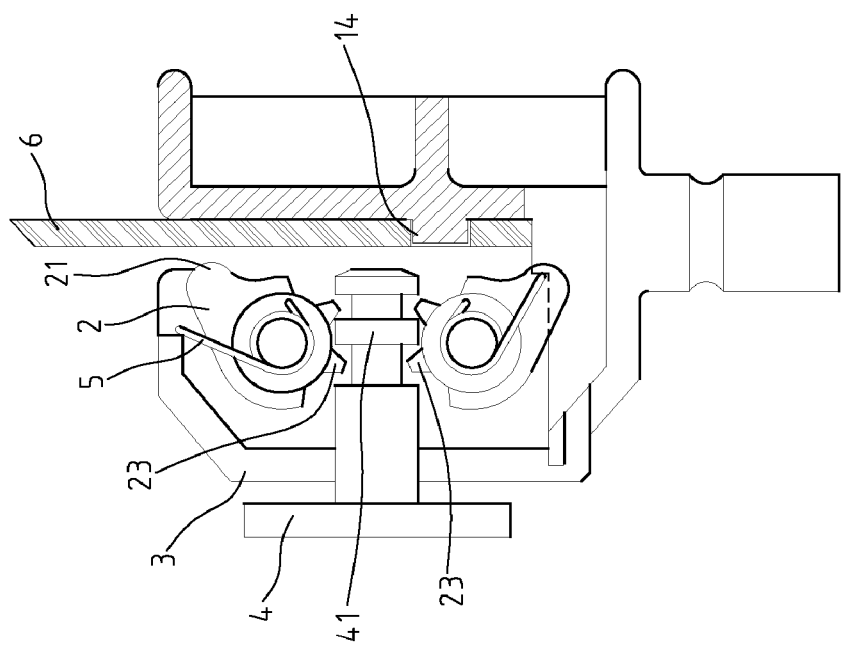
FIG. 4 is a cross sectional view showing a clamping block of a clamp device in accordance with the present invention released for placing a saw blade.
Figure 5:
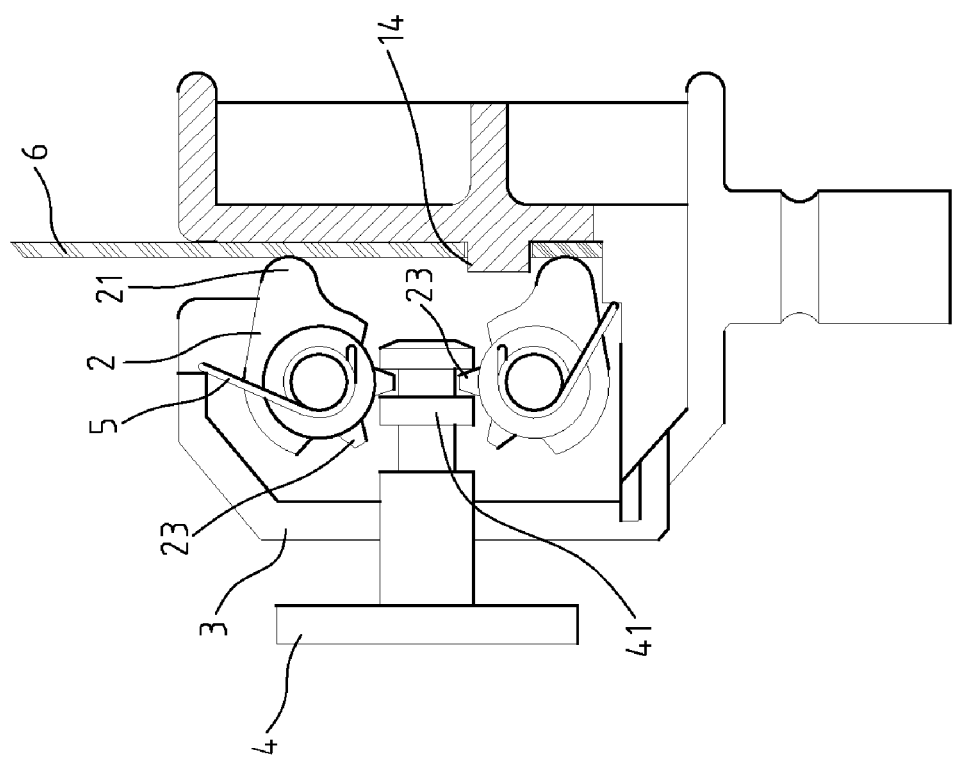
FIG. 5 is a cross sectional view showing a thin saw blade firmly fastened on a clamp device in accordance with the present invention.

Referring to FIG. 4, during the operation, a user presses the button 4 to move the rod 40 in the axial direction, and thereby the tooth slot 41 brings the tooth portion 23 such that the two clamping blocks 2 rotate in the opposite direction with the elastic members 5 storing mechanical energy by the rotation. A saw blade 6 is placed in a space between the clamping blocks 2 and the bracket 1 and has a hole for matching the fixing pin 14 of the bracket 1. When the button 4 is released, the two clamping blocks 2 will rotate back to the initial position by the elastic members 5, whereby the saw blade 6 could be fixed on the bracket 1 by the cam portion 21 of the clamping blocks 2 (see FIG. 5). When the saw blade needs replacing, the user presses the button 4 to loosen the clamp forces of the clamping blocks 2 on the saw blade 6, and thereby the saw blade 6 could be easily removed.

Figure 6:
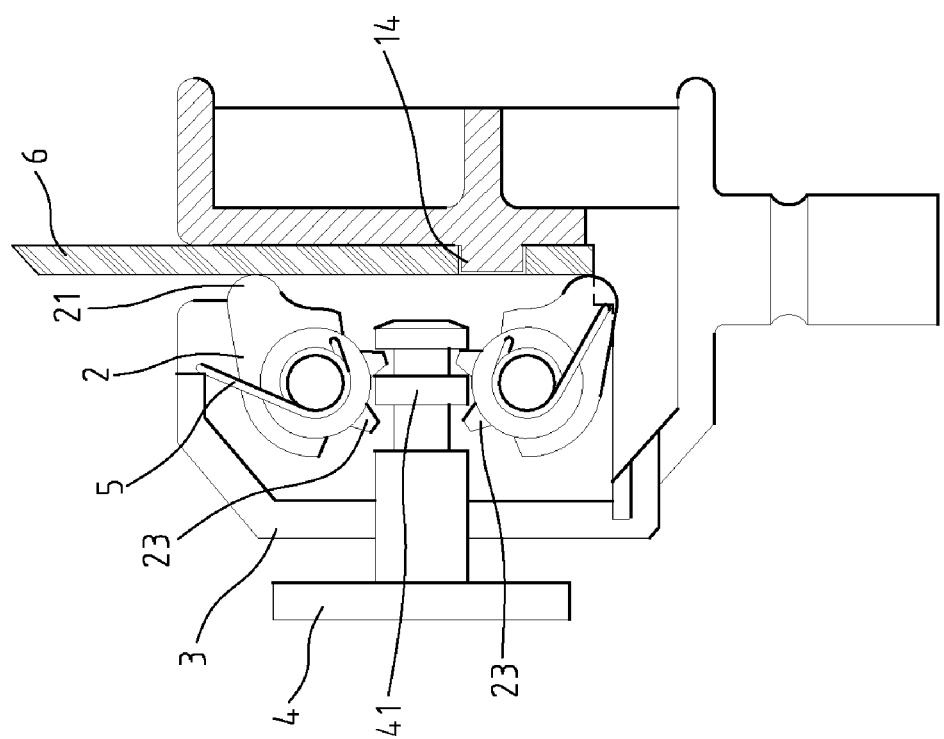
FIG. 6 is a cross sectional view showing a thick saw blade firmly fastened on a clamp device in accordance with the present invention.

Moreover, due to the big space between the clamping blocks 2 and the bracket 1, the saw blade 6 of different thickness could be mounted by the clamping device 1. Referring to FIG. 6, the saw blade with A great thickness 6 can be mounted on the bracket 1 and held firmly by the clamping blocks 2.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A keyless clamp device for a reciprocating saw, comprising:
   a bracket having two side walls, wherein the two side walls defines a space therebetween, and an inner surface of the bracket between the two side walls has a fixing pin for mounting with a saw blade;
   two clamping blocks pivoted between the two side walls, wherein the two clamping blocks each have a tooth portion formed on an outer surface thereof, and two elastic members located between the side wall and the two clamping blocks;
   a cover plate with a through hole disposed on the bracket; and
   a button connected to a rod which passes through the through hole of the cover plate and includes a tooth slot for engaging with the tooth portion formed on the outer surface of the clamping blocks.

2. The keyless clamp device for a reciprocating saw as claimed in claim 1, wherein each clamping block has a cam portion.

3. The keyless clamp device for a reciprocating saw as claimed in claim 1, wherein each elastic member is a torsion spring.

* * * * *